No. 743,879. PATENTED NOV. 10, 1903.
J. P. JENSEN.
THERMOSTATIC POLE CHANGER.
APPLICATION FILED JAN. 22, 1903.
NO MODEL.
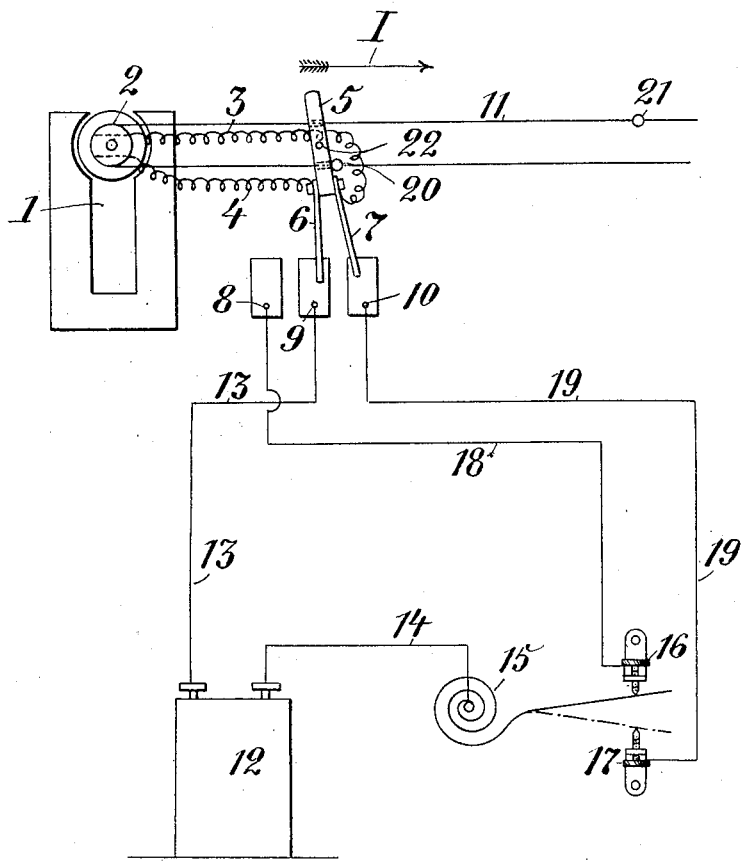
WITNESSES
W. M. Avery.
Walton Harrison
INVENTOR
Jens Pedersen Jensen
BY
Munn
ATTORNEYS.

No. 743,879. Patented November 10, 1903.

UNITED STATES PATENT OFFICE.

JENS PEDERSEN JENSEN, OF ESBJERG, DENMARK, ASSIGNOR TO THOMAS PEDER HANSEN.

THERMOSTATIC POLE-CHANGER.

SPECIFICATION forming part of Letters Patent No. 743,879, dated November 10, 1903.

Application filed January 22, 1903. Serial No. 140,120. (No model.)

*To all whom it may concern:*

Be it known that I, JENS PEDERSEN JENSEN, manufacturer, of 37 Havnegade, Esbjerg, Denmark, have invented certain new and useful Improvements in Thermostatic Pole-Changers, of which the following is a full, clear, and exact specification.

The purpose of my invention is to cause the sunbeams or the increase of temperature to influence an electric-contact arrangement in such a way that the direction of the current in a motor is shifted by sunshine or shadow. Hereby the motor is turned, respectively, in the one or the other direction, and this alternate movement is made use of in an appropriate manner.

My invention may be used in any relation where it may be desirable to have an electric motor shift the position of curtains, sunshades, &c., by the automatic action of heat.

The arrangement may be varied mechanically in many different ways in accordance with the manner in which it is applied.

In the accompanying drawing a sketch (indicating currents) of the invention is shown.

From the anchor 2 on the motor 1 a couple of wires 3 and 4 lead to a current-shifter 5, which is provided with a couple of arms 6 and 7, which are isolated from each other and have contact with the contact-pieces 8, 9, and 10. On the axis of anchor 2 there is a wire reel of wire on which the wire 11 is coiled. The current may be supplied either from a central electric station or from a battery. On the drawing a battery 12 is indicated, which, by a wire 13, is connected with the contact-piece 9. From the other pole of the battery a wire 14 leads to a thermostat, which consists of a properly-arranged spring 15, which can make contact with one of the two contact-screws 16 and 17, which, by the wires 18 and 19, are respectively connected with the contact-places 8 and 10. To the wire 11 a pair of stops 20 and 21 are affixed. The current-shifter 5 is a two-arm beam, which is balanced on the arm 22. The current-shifter is accordingly so affixed to the wire reel on the axis of the anchor 2 that the two stops act each on their respective arm of the current-shifter.

When the sun commences to shine, the spring 15 is thereby heated and finally bends in such a way that it touches the contact-screw 17, as shown by the dotted lines. The current from the negative pole of the battery 12 then goes through wire 13, the contact-place 9, the current-shifter arm 6, wire 4, through the motor 2, wire 3, arm 7, contact-place 10, wire 19, contact-screw 17, spring 15 and wire 14 to the positive pole of the battery. This will cause the motor to rotate, and the wire will be moved in the direction indicated by arrow I till the stop 20, affixed on the wire, touches the current-shifter 5 and turns the same to its opposite outer position. As long as the sun shines the spring 15 will keep the bent form and the contact-points at the screw 17 will be closed, but the current will nevertheless be cut off on account of the altered position of the current-shifter 5. When the sun ceases to shine, the spring 15 straightens itself again and forms contact with the screw 16. The current will then go the contrary way through the motor, which will then draw the wire in the contrary direction of the arrow I. The direction of the current is from the battery 12, through wire 13, arm 6, wire 18, screw 16, spring 15, and wire 14 back to the battery.

It will easily be seen that the invention may be varied in many ways without departing from the principles which are the basis of the same.

Having thus described my invention, what I claim as new, and desire to secure by Letters Patent, is—

1. In an apparatus of the character described, the combination of an electric motor provided with a revoluble member, a pole-changer having a movable member provided with holes, a longitudinal flexible member engaging said revoluble member and threaded through said holes, and stop members mounted upon said longitudinal flexible member and free to engage said movable member of said pole-changer.

2. In an apparatus of the character described, the combination of an electric motor, a pole-changer connected therewith for reversing the same, said pole-changer having a rocking lever provided with holes, a pivot connected with said lever intermediate of said holes and upon which said lever rests, a revoluble member connected with said electric motor and free to move in two directions, a cord connected with said revoluble member and free to move in two directions corresponding to those of the lever, said cord being threaded through said holes of said lever, and stop members mounted upon said cord and free to engage said levers for the purpose of reversing the same.

In witness whereof I have hereunto set my hand.

JENS PEDERSEN JENSEN.

Witnesses:
OTTO WIESEMANN,
PH. SCHERRER.